(12) United States Patent
Yang

(10) Patent No.: US 8,738,336 B2
(45) Date of Patent: May 27, 2014

(54) SYSTEMS AND METHODS FOR ENHANCED CELLULAR AUTOMATA ALGORITHM FOR TRAFFIC FLOW MODELING

(75) Inventor: Ming Yang, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 437 days.

(21) Appl. No.: 13/205,277

(22) Filed: Aug. 8, 2011

(65) Prior Publication Data

US 2013/0041631 A1 Feb. 14, 2013

(51) Int. Cl.
*G06F 7/60* (2006.01)
*G06F 17/10* (2006.01)

(52) U.S. Cl.
USPC .......................................................... 703/2

(58) Field of Classification Search
USPC .......................................................... 703/2
See application file for complete search history.

(56) References Cited

PUBLICATIONS

Chapter 34 Microscopic Traffic Flow Modeling, NPTEL May 24, 2006.*

* cited by examiner

*Primary Examiner* — Saif Alhija
(74) *Attorney, Agent, or Firm* — MH2 Technology Law Group LLP

(57) ABSTRACT

An embodiment generally relates to systems and methods for enhanced cellular automata (CA) models. A processing module can generate a traffic model that comprises a set of vehicles. The traffic model can be processed according to the enhanced CA model. In particular, a perceived gap between vehicles in the set of vehicles can be identified. Further, a subsequent velocity of a following vehicle can be calculated based on metrics such as a maximum velocity, the perceived gap, and various time components.

20 Claims, 5 Drawing Sheets

US 8,738,336 B2

SYSTEMS AND METHODS FOR ENHANCED CELLULAR AUTOMATA ALGORITHM FOR TRAFFIC FLOW MODELING

FIELD OF THE INVENTION

This invention relates generally to traffic flow modeling and, more particularly, to systems and methods for an enhanced cellular automata algorithm for traffic flow modeling.

BACKGROUND OF THE INVENTION

Traffic can be a major problem in some areas, such as in some urban infrastructures. In particular, the capacity of some road networks can be at its limits, and frequent traffic jams or other congestions can impact economic productivity and other factors. As a result of increased urbanization, population density, motorization, and general population, traffic congestion has been increasing on transport infrastructures. In some of these areas, the ability to construct more roads can be untenable or impossible. Therefore, the efficient vehicular transport of people and goods is vital to economies.

There is a need to accurately and realistically predict traffic flow patterns within traffic infrastructures and networks. Further, because many urban areas are experiencing population growth, the need is expanding. Various vehicle following models are presently used to model traffic flows and patterns. For example, existing modeling algorithms include Chandler Model, Generalized GM Model, Gipps Model, Krauss Model, Leutzbach Model, Cellular Automata, Optimum Velocity Model, Newell Model, and others.

Some of the existing vehicle following modeling algorithms are dependent on a history of data. For example, when a vehicle switches lanes, history information can be "lost" and the results of some of the existing models can be inaccurate or incomplete. In contrast, the Cellular Automata (CA) model can be a useful model because it depends only on the previous step of the model. However, the CA model can sometimes prove, in some situations, to be inaccurate or otherwise insufficient.

Therefore, it may be desirable to have systems and methods for improving the performance and accuracy of traffic models. In particular, it may be desirable to have systems and methods for modifying the CA modeling algorithm to increase the accuracy and efficiency of traffic simulators.

SUMMARY

An embodiment pertains generally to a method of simulating traffic. The method comprises generating a traffic model comprising a leading vehicle and a following vehicle and identifying, in the traffic model, a perceived gap between the leading vehicle and the following vehicle. Further, the method comprises calculating, by a processor, a subsequent velocity of the following vehicle at a subsequent time step based on a maximum velocity of the following vehicle, the perceived gap, and a specified time parameter.

Another embodiment pertains generally to a system for simulating traffic. The system comprises a processor coupled to memory and configured to generate a traffic model comprising a leading vehicle and a following vehicle and identify, in the traffic model, a perceived gap between the leading vehicle and the following vehicle. Further, the processor is configured to calculate a subsequent velocity of the following vehicle at a subsequent time step based on a maximum velocity of the following vehicle, the perceived gap, and a specified time parameter.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Figure 1:
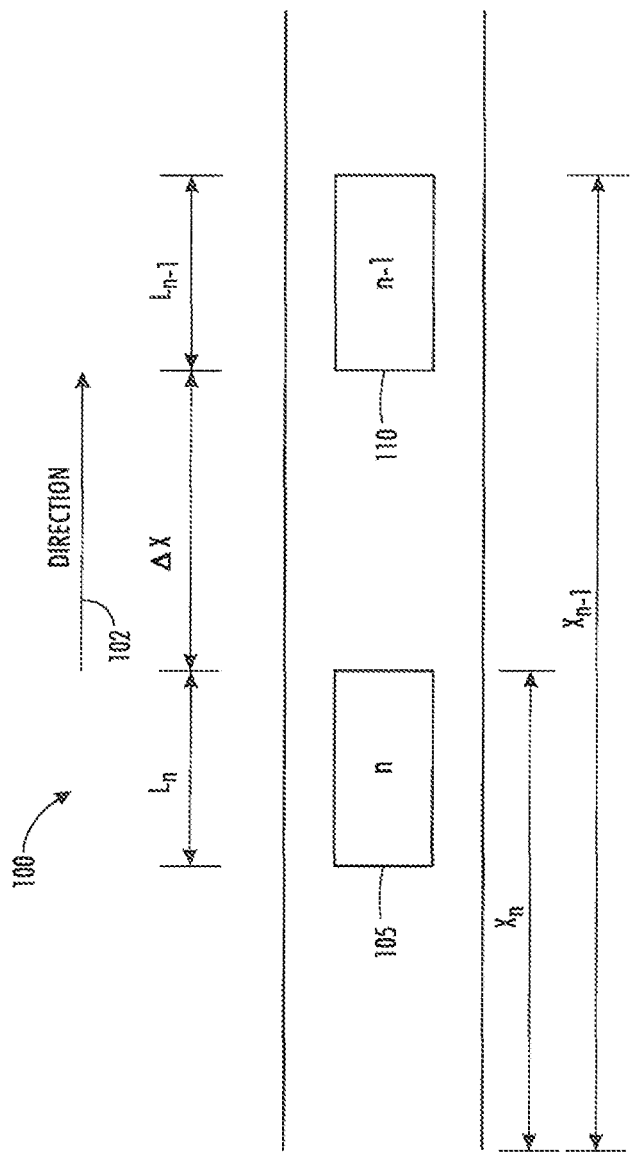
FIG. 1 illustrates an exemplary vehicle positioning environment in accordance with embodiments.

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

As used herein, "optimize" or variations thereof can be a general term that can refer to the best available option. In other words, an "optimized" configuration need not represent the best possible configuration, but instead can mean the preferred configuration of the possible configurations. Further, the term "optimize" can also mean maximize, enhance, improve, or other terms related to a preferred or improved performance level.

As used herein, a "model" or variations thereof can be a generalized term that can refer to a simulation, forecast, abstraction, and/or the like of data. A processing module, application, or other entity can use modeling or variations thereof to process inputs or other available data to simulate one or more exemplary or real life environments. For example, according to the present embodiments, a traffic flow model can be created and/or processed to simulate traffic flow in a roadway infrastructure. Further, as used herein, "traffic flow" or variations thereof can refer to the movement of vehicles, such as automobiles, trucks, motorcycles, and the like, across or through roadways, intersections, highways, or any other infrastructure components.

Embodiments generally relate to systems and methods for modeling vehicle traffic flow. More particularly, a processing module, application, or other entity or logic can process and/or model traffic in accordance with the techniques as described herein. In embodiments, the processing module can utilize Cellular Automata (CA) models and/or algorithms to forecast, simulate, or otherwise model traffic flow behavior. The processing module can be a part of or otherwise incorporated into a computing system, device, or other hardware.

In general, CA models and/or algorithms are discrete models that consist of a regular grid of "cells," each of which is in a finite number of states. The cells evolve through a number of discrete time steps according to a set of rules based on states (e.g. "on" and "off") of a set of neighboring cells. The neighborhood of a specified cell can be defined relative to the specified cell. For example, the neighborhood of cells can be defined to be the set of cells a distance of two (2) or less from the specified cell. The initial time state can be t=0. A generation is created after a set of rules is tested and/or applied, and the time state can be advanced to t=1, and so on. For example, a rule can be that a specified cell is "on" in the next generation if three or more of the cells in the neighborhood of the specified cell are "on," otherwise the specified cell is "off" in the next generation. In embodiments, the rules can be uniform for each cell in the grid, and can remain the same in subsequent generations. However, it should be understood that there can be multiple rules that can be applied to multiple generations.

In general, CA models can capture micro-level data and/or dynamics, and apply those to traffic flow behavior on a macro level. For example, micro-level data can correspond to simulations of single vehicle-driver units, and can comprise properties such as the position and velocity of a single vehicle. In contrast, macro-level data can correspond to simulations of multiple vehicles, and can comprise parameters such as travel time and throughput. CA models can capture complexities of real traffic by allowing different vehicles to possess different behaviors such as, for example, lane change rules, reaction times, acceleration/deceleration, and other behaviors. As such, CA models can reproduce some non-trivial traffic phenomena such as, for example, spontaneous traffic jams.

Table 1 comprises notations, variables, and other data related to the embodiments as described herein. In particular, the symbols in the left column of Table 1 can refer to the variable notation corresponding to the variable name in the middle column of Table 1. Further, the units of the corresponding variable are listed in the right column of Table 1.

TABLE 1

| | | |
|---|---|---|
| $a_n$ | Acceleration, vehicle n | [m/s$^2$] |
| $x_n$ | Position, vehicle n | [m] |
| $v_n$ | Speed, vehicle n | [m/s] |
| $\Delta x$ | $x_{n-1} - x_n$, space headway | [m] |
| $\Delta v$ | $v_n - v_{n-1}$, difference in speed | [m/s] |
| $v_n^{desired}$ | Desired speed, vehicle n | [m/s] |
| $L_{n-1}$ | Length, vehicle (n−1) | [m] |
| $S_{n-1}$ | Effective length ($L_{n-1}$ + min gap between stationary vehicles), vehicle (n−1) | [m] |
| T | Reaction time | [s] |
| $\Delta t$ | Units of time | [s] |

FIG. 1 is an illustration detailing an exemplary vehicle positioning environment 100. It should be readily apparent to one of ordinary skill in the art that the environment 100 depicted in FIG. 1 represents a generalized schematic illustration and that other components can be added or existing components can be removed or modified.

As shown in FIG. 1, the environment 100 can comprise a first vehicle (n) 105 and a second vehicle (n-1) 110. The first vehicle 105 and the second vehicle 110 can be traveling in a direction as indicated by 102, at respective velocities of $v_n$ and $v_{n-1}$. As shown in FIG. 1, the $x_n$ metric can correspond to the position of the first vehicle 105, and the $x_{n-1}$ metric can correspond to the position of the second vehicle. Further, the $L_n$ metric can correspond to the length of the first vehicle 105 and the $L_{n-1}$ metric can correspond to the length of the second vehicle 110. Moreover, the $\Delta x$ metric can correspond to the space headway between the first vehicle 105 and the second vehicle 110.

In embodiments, CA models can use variables to describe the dynamic properties of traffic flow. The roads on which the vehicles travel can be divided into sections of a certain length and the time can be segmented into steps of $\Delta t$. In embodiments, $\Delta t$ can be approximately equal to the average reaction time of a human driver, such as, for example, 1 second.

In embodiments, a CA model can be defined by equation 1:

$$v_n(t + \Delta t) = \min\left\{\frac{g_n(t)}{T}, v_n(t) + a, V\right\} \quad (1)$$

In equation 1, a corresponds to the maximum velocity change in each time step. Further, $g_n$ is the perceived gap or distance between vehicles, such as the perceived gap between a leading vehicle and a following vehicle, wherein $g_n(t) = x_{n-1}(t) - x_n(t) - s_{n-1}$. More particularly, $x_{n-1}(t)$ can correspond to the position of the leading vehicle at time t and $x_n(t)$ can correspond to the position of the following vehicle at time t. In embodiments, the leading vehicle can be moving or stationary. Still further, V is the maximum velocity of a vehicle, T is an input parameter specified in a unit of time such as, for example, seconds, and $\Delta t$ is the simulation time step or interval.

The CA model as defined by equation 1 can have some drawbacks, however. In particular, the drawbacks can occur when the following vehicle is getting into a distance that is considered to be "close" to the leading vehicle, especially in situations in which the leading vehicle is stationary. In embodiments, a distance that is considered to be "close" can be approximately 60 m, or other values. In these situations, the velocity of the following vehicle, as modeled by equation (1), can change suddenly, which leads to a "jump" in the acceleration of the following vehicle. Further, when the velocity of the following vehicle reduces, the reduction can be sudden, thus impacting the deceleration of the following vehicle.

According to present embodiments, the CA model as defined in equation (1) can be optimized or otherwise enhanced such that the drawbacks of the CA model as defined in equation (1) can be reduced or eliminated. Further, the enhanced technique retains the advantage of the CA model while correcting the velocity and acceleration drawbacks. The enhanced CA model can be defined by equation (2):

$$v_n(t + \Delta t) = \min\left\{ \sqrt{\frac{Vg_n(t)}{T'}}, v_n(t) + a, V \right\} \quad (2)$$

In equation (2), T' is an input parameter specified in a unit of time (e.g. seconds), and is similar to T in equation (1), and the other parameters correspond to the same variables or values as discussed herein. According to the enhanced CA model as defined in equation (2), the following vehicle will keep away from the leading vehicle a distance that corresponds to the distance that the following vehicle will travel in a specified time (T') with the following vehicle's next step velocity.

Figure 2:
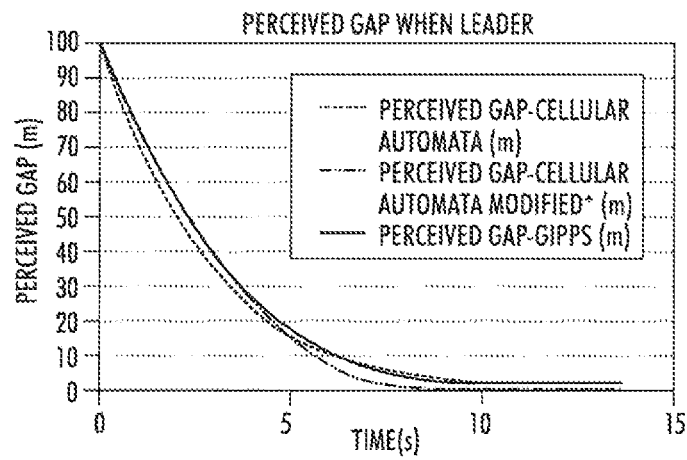
FIG. 2 is a chart depicting traffic flow modeling data in accordance with embodiments.
Figure 3:
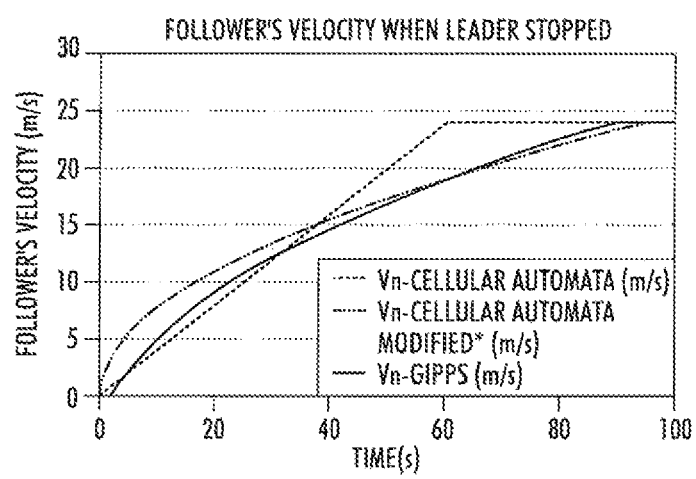
FIG. 3 is a chart depicting traffic flow modeling data in accordance with embodiments.
Figure 4:
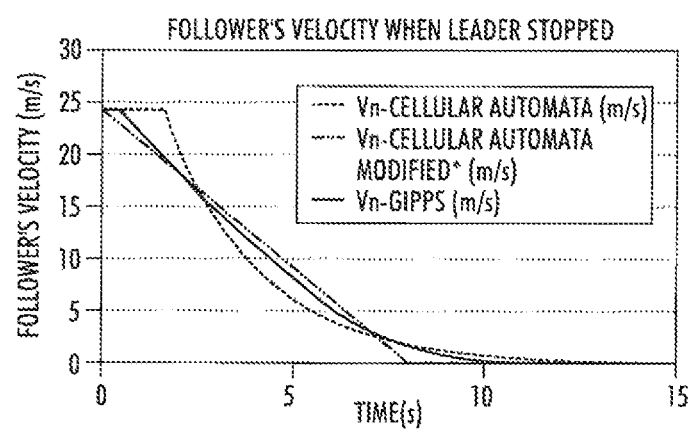
FIG. 4 is a chart depicting traffic flow modeling data in accordance with embodiments.

FIGS. 2-4 summarize the following vehicle's behavior when the leading vehicle is stationary or stopped. There are a total of three (3) models or techniques depicted in FIGS. 2-4, namely, Gipps' safe distance algorithm, the CA model as defined in equation (1), and the enhanced CA model as defined in equation (2).

FIG. 2 depicts a chart of the following vehicle's perceived gap (m) from the stopped leading vehicle as a function of time (s). Further, FIG. 3 depicts a chart of the following vehicle's velocity (m/s) as a function of perceived gap (m) when the leading vehicle is stopped. Still further, FIG. 4 depicts a chart of the following vehicle's velocity (m/s) as a function of time (s) when the leading vehicle is stopped.

As shown in FIG. 2, the perceived gap ($g_n$) when the leading vehicle is stopped does not vary much among the three models. However, when the following vehicle's velocity ($v_n$) is compared to the perceived gap, as shown in FIG. 3, the CA model as defined in equation (1) shows that the following vehicle's velocity increases in a linear fashion as the perceived gap increases, but then abruptly levels off when the perceived gap hits about 60 meters. Because an abrupt leveling-off of a vehicle's velocity is not common in reality, the CA model as defined in equation (1) can be inaccurate.

In contrast, in the enhanced CA model as defined in equation (2), and as shown in FIG. 3, the following vehicle's velocity increases more at small perceived gaps, and then gradually increases for all of the values of the perceived gaps. Therefore, the enhanced CA model as defined in equation (2) more accurately depicts the real-life behavior of the following vehicle when the leading vehicle is stopped.

Further, as shown in FIG. 4, in the CA model as defined in equation (1), the following vehicle's velocity abruptly slows from a consistent speed when the time reaches about 2 seconds. This behavior, too, is not common in reality, and the CA model as defined in equation (1) can further be inaccurate. In contrast, as shown in FIG. 4, in the enhanced CA model as defined in equation (2), the following vehicle's velocity gradually decreases as time progresses until the following vehicle's velocity reaches zero. This behavior is more accurate to a following vehicle's actions in reality, and thus makes the enhanced CA model as defined in equation (2) a more accurate model than the CA model as defined in equation (1).

Figure 5:
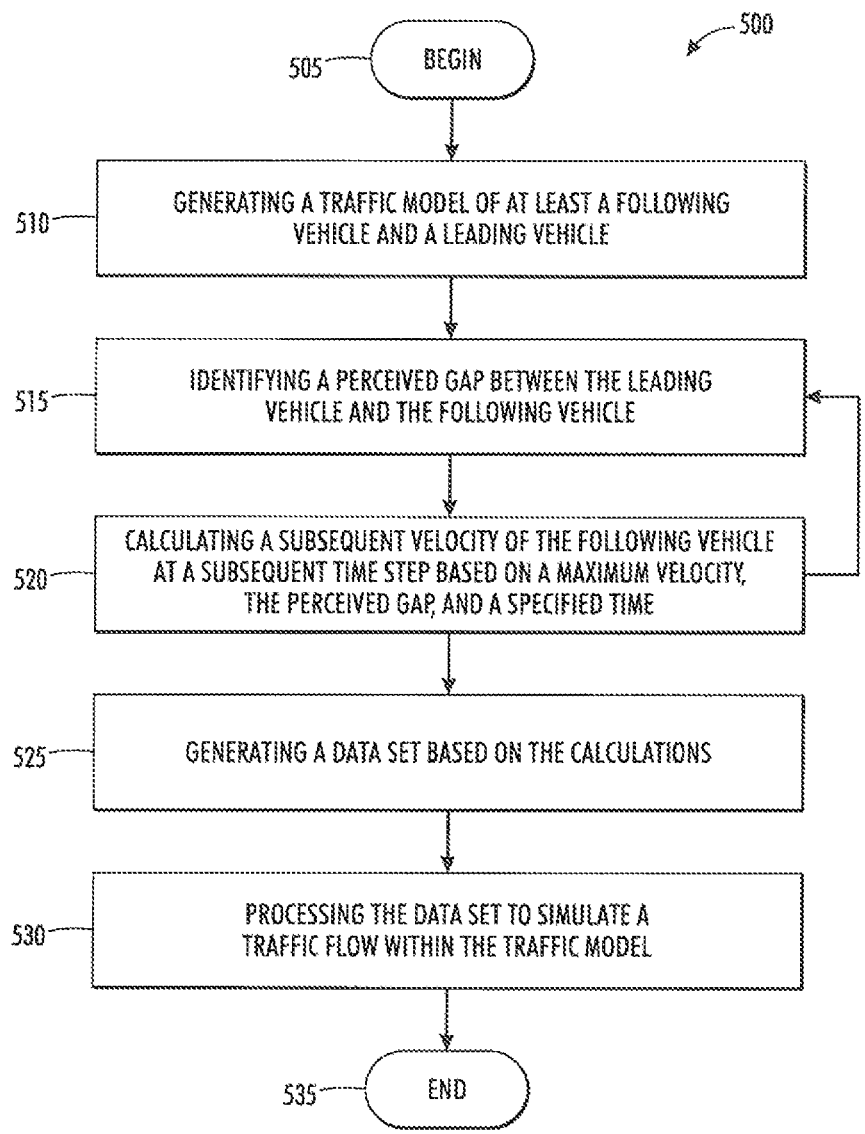
FIG. 5 illustrates an exemplary flow diagram of a traffic simulator in accordance with embodiments.

Referring to FIG. 5, depicted is a flowchart detailing a technique 500 used to model traffic flow in accordance with the enhanced CA model as defined in equation (2). It should be readily apparent to those of ordinary skill in the art that the flow diagram depicted in FIG. 5 represents a generalized illustration and that other steps can be added or existing steps can be removed or modified.

In 505, processing can begin. In 510, a traffic model can be generated. In embodiments, the traffic model can comprise a following vehicle, a leading vehicle positioned in front of the following vehicle, and/or other vehicles. In 515, a perceived gap between the leading vehicle and the following vehicle can be identified. In embodiments, the perceived gap can be calculated using an equation: $x_{n-1}(t) - x_n(t) - s_{n-1}$, wherein $x_{n-1}(t)$ corresponds to a position of the leading vehicle, $x_n(t)$ corresponds to a position of the following vehicle, and $s_{n-1}$ corresponds to a length of the leading vehicle. In further embodiments, the leading vehicle can be stationary.

In 520, a subsequent velocity of the following vehicle at a subsequent time can be calculated based on a maximum velocity of the following vehicle, the perceived gap, and a specified time. In embodiments, the maximum velocity can be an input parameter or can otherwise be available to a processing module, application, or other logic. In embodiments, the subsequent velocity can be calculated using an equation:

$$\sqrt{\frac{Vg_n(t)}{T'}},$$

wherein V corresponds to the maximum velocity, $g_n(t)$ corresponds to the perceived gap, and T' corresponds to the specified time. Further, in embodiments, the processing module can calculate a current velocity of the following vehicle at a current time, and select, as an output, a minimum of a set $$\left\{ \sqrt{\frac{Vg_n(t)}{T'}}, v_n(t) + a, V \right\},$$

wherein V corresponds to the maximum velocity $g_n(t)$ corresponds to the perceived gap, T' corresponds to the specified time, $v_n(t)$ corresponds to the current velocity, and a corresponds to a maximum allowable velocity change in one simulation time step.

After the subsequent velocities for any or all vehicles in the road network are calculated, processing can proceed back to 515 where a time segment can be iterated and a new perceived gap can be calculated, in addition to a new subsequent velocity. In embodiments, the processing can repeat steps 515 and 520 one or more times, for a set time period, a set number of times, or any other repeat processing. In 525, a data set can be generated based on the calculations. In embodiments, the data set can comprise each identified or calculated perceived gap, subsequent velocity, selected output in accordance with the enhanced CA model as defined in equation (2), or other data. In 530, the data set can be processed to simulate a traffic flow within the traffic model. In embodiments, the data set can be provided to a user, administrator, or other entity, for viewing, analysis, or other purposes, or can be stored in storage or memory for later retrieval.

Figure 6:
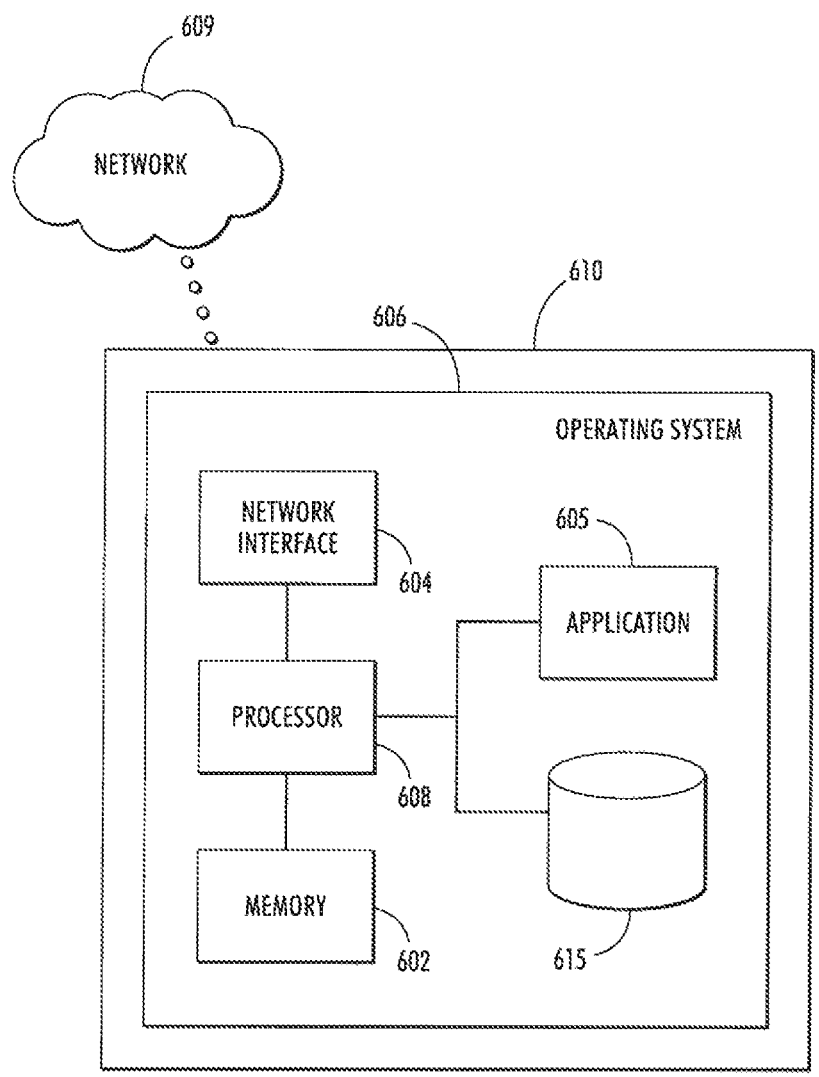
FIG. 6 illustrates a hardware diagram in accordance with embodiments.

FIG. 6 illustrates an exemplary diagram of hardware and other resources that can be incorporated with processing and logic associated with the present embodiments. As shown in FIG. 6, a server 610 can be configured to communicate with a network 609. In embodiments as shown, the server 610 can comprise a processor 608 communicating with memory 602, such as electronic random access memory, or other forms of transitory or non-transitory computer readable storage mediums, operating under control of or in conjunction with an operating system 606. The operating system 606 can be any commercial, open-source, or proprietary operating system or platform. The processor 608 can communicate with a database 615, such as a database stored on a local hard drive. While illustrated as a local database in the server 610, the database 615 can be separate from the server 610.

The processor 608 can further communicate with a network interface 604, such as an Ethernet or wireless data connection, which in turn communicates with the network 609, such as the Internet or other public or private networks. The processor 608 can also communicate with the database 615 or any applications 605, such as applications associated with the processing module, to execute control logic and perform data processing, as described herein.

While FIG. 6 illustrates the server 610 as a standalone system comprising a combination of hardware and software, the server 610 can also be implemented as a software application or program capable of being executed by a conventional computer platform. For example, it should be understood that the components of the server 610 can be implemented on user PCs or other hardware such that the user PCs can communicate directly with the database 615. Likewise, the server 610 can also be implemented as a software module or program module capable of being incorporated in other software applications and programs. In either case, the server 610 can be implemented in any type of conventional proprietary or open-source computer language.

Certain embodiments can be performed as a computer program. The computer program can exist in a variety of forms both active and inactive. For example, the computer program can exist as software program(s) comprised of program instructions in source code, object code, executable code or other formats; firmware program(s); or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of simulating traffic, the method comprising:
generating a traffic model comprising a leading vehicle and a following vehicle;
identifying, in the traffic model, a perceived gap between the leading vehicle and the following vehicle;
calculating a current velocity of the following vehicle at a current time;
selecting, as an output, a minimum of a set $$\left\{\sqrt{\frac{Vg_n(t)}{T^*}},\ v_n(t)+a,\ V\right\},$$

wherein V corresponds to a maximum velocity of the following vehicle, $g_n(t)$ corresponds to the perceived gap, T' corresponds to a specified time parameter, $v_n(t)$ corresponds to the current velocity of the following vehicle, and a corresponds to an allowable maximum velocity change in a single time step; and
calculating, by a processor, a subsequent velocity of the following vehicle at a subsequent time step based on the maximum velocity of the following vehicle, the perceived gap, and the specified time parameter.

2. The method of claim 1, wherein the subsequent velocity of the following vehicle is calculated using an equation $$\sqrt{\frac{Vg_n(t)}{T^*}}.$$

3. The method of claim 1, wherein the perceived gap is calculated using an equation $x_{n-1}(t)-x_n(t)-s_{n-1}$, wherein $x_{n-1}(t)$ corresponds to a position of the leading vehicle, $x_n(t)$ corresponds to a position of the following vehicle, and $s_{n-1}$ corresponds to a length of the leading vehicle.

4. The method of claim 1, further comprising:
providing the output to a user.

5. The method of claim 1, further comprising:
identifying at least one additional vehicle in the traffic model;
repeating the identifying and the calculating for the at least one additional vehicle; and
generating a data set based on the repeating.

6. The method of claim 1, further comprising:
iterating a time step;
repeating the identifying and the calculating according to the time step; and
generating a data set based on the repeating.

7. The method of claim 6, further comprising:
processing the data set to simulate a traffic flow within the traffic model.

8. The method of claim 6, further comprising:
storing the data set in memory.

9. The method of claim 1, wherein the leading vehicle is stationary.

10. The method of claim 1, wherein the traffic model is used to model a traffic flow in a transportation infrastructure.

11. A system for simulating traffic, the system comprising:
a processor coupled to memory and configured to perform actions comprising:
  generating a traffic model comprising a leading vehicle and a following vehicle;
  identifying, in the traffic model, a perceived gap between the leading vehicle and the following vehicle;
  calculating a current velocity of the following vehicle at a current time;
  selecting, as an output, a minimum of a set $$\left\{ \sqrt{\frac{Vg_n(t)}{T^*}},\ v_n(t)+a,\ V \right\},$$

wherein V corresponds to a maximum velocity of the following vehicle, $g_n(t)$ corresponds to the perceived gap, T' corresponds to a specified time parameter, $v_n(t)$ corresponds to the current velocity of the following vehicle, and a corresponds to a maximum allowable velocity change in a single time step; and
  calculating a subsequent velocity of the following vehicle at a subsequent time step based on the maximum velocity of the following vehicle, the perceived gap, and the specified time parameter.

12. The system of claim 11, wherein the subsequent velocity of the following vehicle is calculated using an equation $$\sqrt{\frac{Vg_n(t)}{T^*}}.$$

13. The system of claim 11, wherein the perceived gap is calculated using an equation $x_{n-1}(t)-x_n(t)-s_{n-1}$, wherein $x_{n-1}(t)$ corresponds to a position of the leading vehicle, $x_n(t)$ corresponds to a position of the following vehicle, and $s_{n-1}$ corresponds to a length of the leading vehicle.

14. The system of claim 11, wherein the processor is further configured to perform actions comprising:
providing the output to a user.

15. The system of claim 11, wherein the processor is further configured to perform actions comprising:
  identifying at least one additional vehicle in the traffic model;
  repeating the identifying and the calculating for the at least one additional vehicle; and
  generating a data set based on the repeating.

16. The system of claim 11, wherein the processor is further configured to perform actions comprising:
  iterating a time step;
  repeating the identifying and the calculating according to the time step; and
  generating a data set based on the repeating.

17. The system of claim 16, wherein the processor is further configured to perform actions comprising:
  processing the data set to simulate a traffic flow within the traffic model.

18. The system of claim 16, wherein the processor is further configured to perform actions comprising:
  storing the data set in memory.

19. The system of claim 11, wherein the leading vehicle is stationary.

20. The system of claim 11, wherein the traffic model is used to model a traffic flow in a transportation infrastructure.

* * * * *